United States Patent [19]

Putnam

[11] Patent Number: 4,828,324
[45] Date of Patent: May 9, 1989

[54] KNOCKDOWN UPHOLSTERED FURNITURE CONSTRUCTION

[76] Inventor: Monroe P. Putnam, P.O. Box M, Walworth, Wis. 53184

[21] Appl. No.: 553,754

[22] Filed: Nov. 21, 1983

[51] Int. Cl.⁴ ............................................. A47C 17/02
[52] U.S. Cl. .................... 297/440; 403/189; 403/192
[58] Field of Search ............. 297/218, 227, 229, 232, 297/233, 440, 443, 444; 403/189-192, 199

[56] References Cited

U.S. PATENT DOCUMENTS

| | | | |
|---|---|---|---|
| 2,463,124 | 3/1949 | Sims | 403/379 X |
| 2,846,248 | 8/1958 | Kliwer | 403/379 |
| 3,698,766 | 10/1972 | Borenstein | 297/443 X |
| 3,743,351 | 7/1973 | Harris | 297/233 X |
| 3,774,966 | 11/1973 | Faulkner et al. | 297/440 |
| 3,985,460 | 10/1976 | Piper et al. | 403/190 X |
| 4,114,949 | 9/1978 | Benoit | 297/332 X |
| 4,165,902 | 8/1979 | Ehrlich | 297/440 |
| 4,188,066 | 2/1980 | Terenzoni | 297/440 |

FOREIGN PATENT DOCUMENTS

| | | | |
|---|---|---|---|
| 819147 | 10/1951 | Fed. Rep. of Germany | 403/190 |
| 561384 | 8/1923 | France | 403/191 |

*Primary Examiner*—Peter R. Brown
*Attorney, Agent, or Firm*—Vernon J. Pillote

[57] ABSTRACT

A knockdown upholstered furniture construction including a pair of end frames, first, second and third elongated metal tubes detachably secured by first, second and third tube end connector members to the end frames. The first tube extends between the forward portions of the end frames and the second and third tubes extend between the rear portions of the end frames with the third tube at a level above the second tube. A seat support is removably mounted on the first and second tubes and extends therebetween and an upholstered back support extends between the third tube and the seat support. In two and three-seat sofas, the seat and back supports are formed in a plurality of sections.

17 Claims, 3 Drawing Sheets

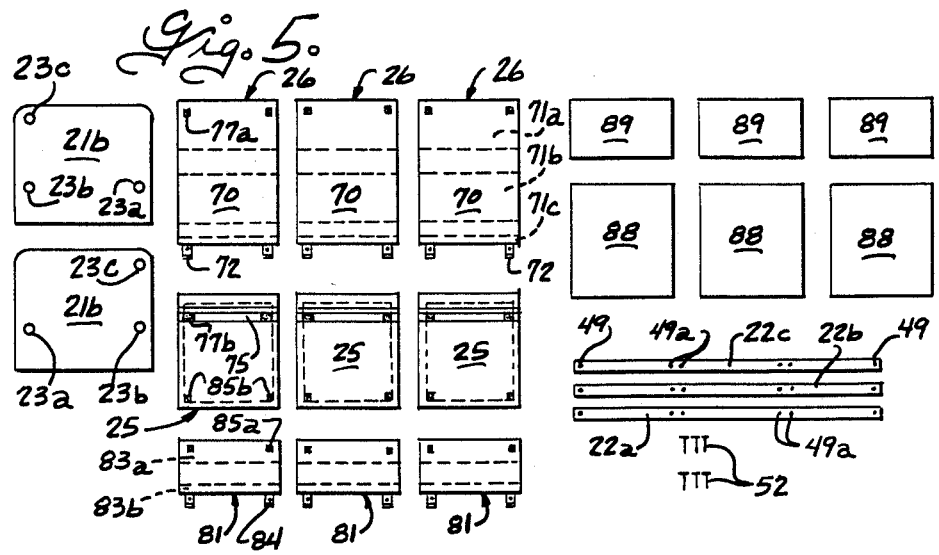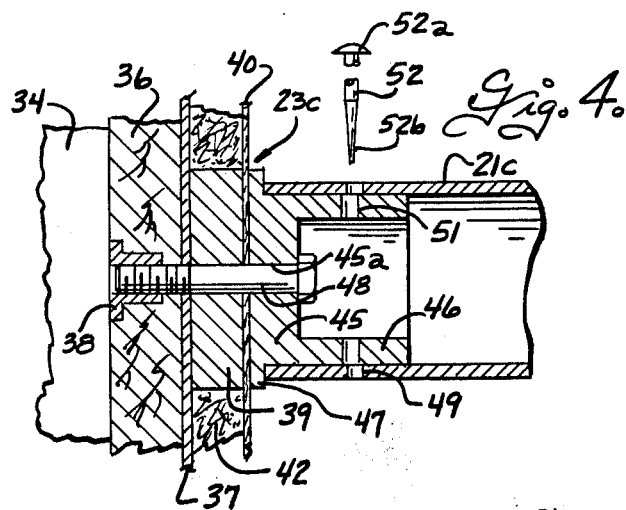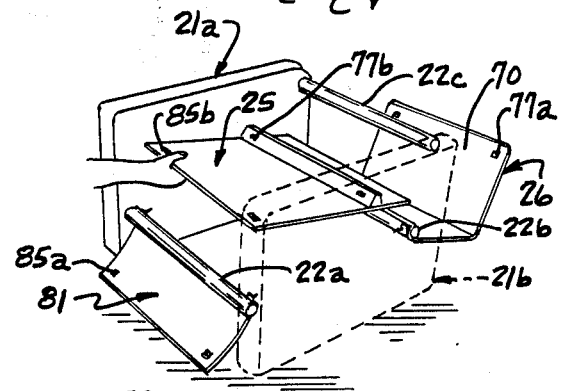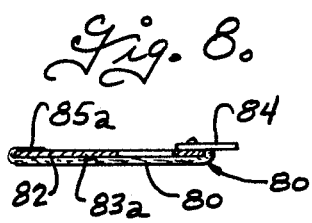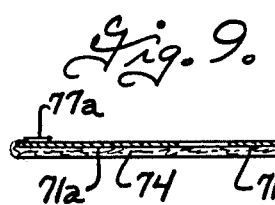

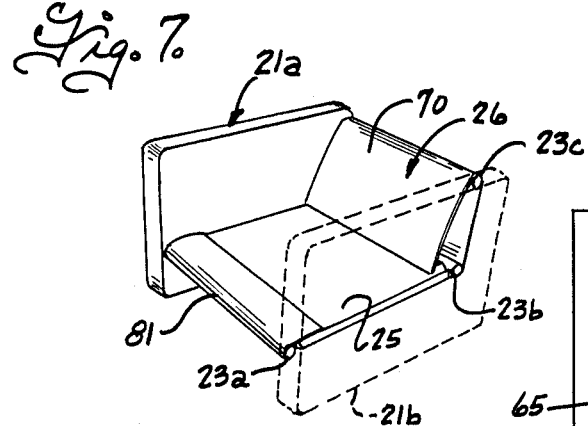
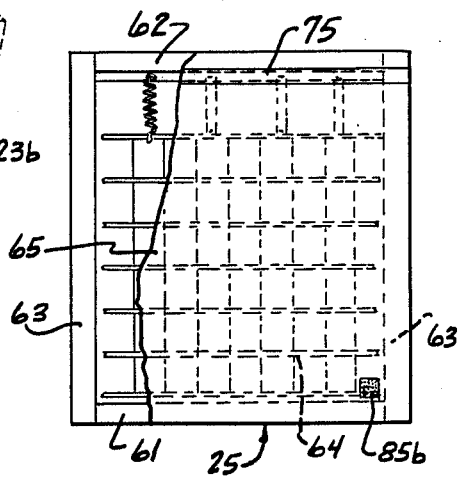
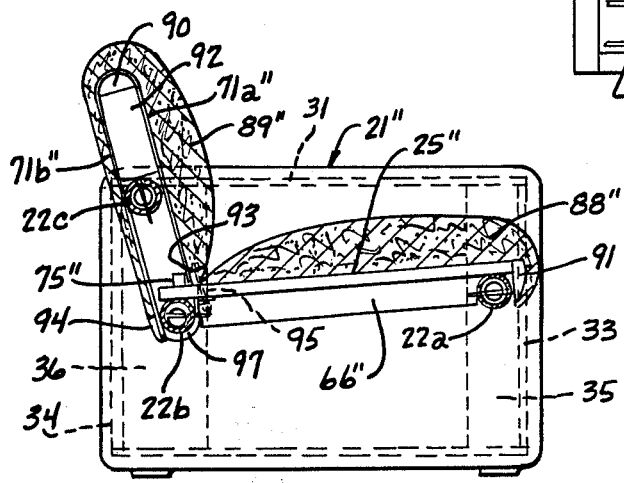
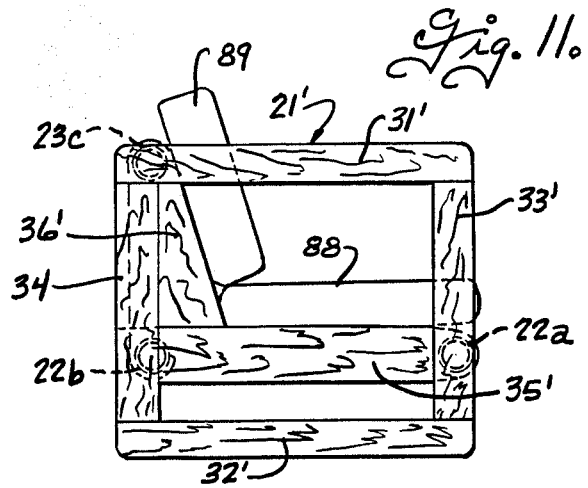

KNOCKDOWN UPHOLSTERED FURNITURE CONSTRUCTION

BACKGROUND

Upholstered furniture such as chairs, love seats and sofas are very large and bulky. It has heretofore been proposed, for example as shown in U.S. Pats. Nos. 3,774,966 and 4,165,902, to make knockdown upholstered furniture which it could be disassembled to reduce the space requirements for storage and transportation. However, such prior knockdown furniture constructions utilized a pair of end frames and a unitary seat support frame and a unitary back support frame that extended between the end frames. In sofas and love seats, such unitary seat support frames and back support frames are very large and exceed the maximum package size limitations imposed by some carriers. For example, the current maximum package size that can be shipped through United Parcel Service is 108 inches combined length and girth, and a one-piece seat support frame or back support frame for a sofa would exceed this size limitation.

SUMMARY OF THE INVENTION

An important object of this invention is to provide a knockdown upholstered furniture construction which can be disassembled into small sections and pieces to enable compact storage and transportation.

Another object of this invention is to provide a knockdown upholstered furniture construction which is easy to assemble and which is strong and durable in use.

Still another object of this invention is to provide a knockdown upholstered furniture construction that can be made in different styles.

Accordingly, the present invention provides a knockdown upholstered furniture construction comprising first and second spaced end frames, first, second and third individual metal tubes, and first, second and third tube end connector members mounted on the adjacent side faces of each of the first and second end frames. The first tube end connector members are mounted adjacent the front of the first and second end frames and the second and third tube end connector members are mounted adjacent the rear of the first and second end frames with the third tube end connector members spaced above the second tube end connector member on the respective end frame. The tube end connector members have tube engaging portions telescopically engageable with the end of a tube, and pin means extends transversely of the tube and into the tube engaging portion for detachably securing the ends of the first, second and third tubes to the respective first, second and third tube end connector members on the first and second end frames. Generally horizontal seat support means are removably supported on the first and second tubes and extend therebetween. A removable upholstered back support extends downwardly at the front side of the third tube to the seat support.

In love seats and sofas, the seat support is formed in a plurality of sections each of which extends between the first and second tubes at different locations therealong. In sofas and love seats, the removable back support is also advantageously formed in a plurality of sections disposed in end-to-end relation along the third tube.

BRIEF DESCRIPTION OF THE DRAWINGS

FIG. 4 is a fragmentary sectional view illustrating parts on a larger scale than FIG. 3;

FIG. 5 is a layout of the parts of a three-seat sofa embodying the present invention;

FIGS. 6 and 7 are perspective views illustrating different steps in the assembly of an upholstered chair constructed in accordance with the present invention;

FIG. 8 is a sectional view through a front upholstery wrap;

FIG. 9 is a sectional view through a rear upholstery wrap;

FIG. 10 is a plan view of a seat support with parts broken away to show details of construction;

FIG. 11 is an end elevational view of a second embodiment of the upholstered chair construction having a modified form of end frame; and FIG. 12 is a transverse sectional view through a third form of chair construction embodying the present invention.

DETAILED DESCRIPTION

Figure 1:
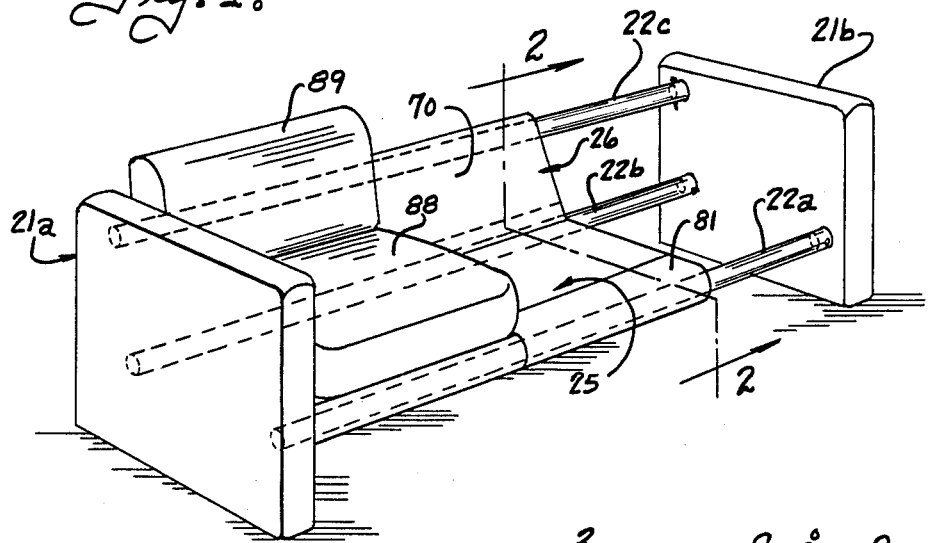
FIG. 1 is a perspective view of a sofa embodying the present invention, and with parts removed to illustrate details of construction.

The upholstered furniture construction of the present invention includes left and right end frames 21a and 21b and three metal tubes designated 22a, 22b and 22c that extend between the end frames and are detachably secured thereto by end connector members 23a–23c respectively (see FIG. 5). The upholstered furniture construction can be made in the form of a single chair as shown in FIGS. 6 and 7, a two-seat sofa, or a three-seat sofa as shown in FIG. 1, by utilizing different length tubes. The first tube end connector members 23a are mounted on the inner side faces of the end frames 21a and 21b adjacent the front and at a location spaced above the bottom of the end frames, and the second and third tube end connector members are mounted adjacent the rear of the end frames with the third tube end connector members spaced above the second tube end connector members on the respective end frame. A generally horizontal seat support is removably supported on the first and second tubes 22a and 22b and extends therebetween. In a single seat chair, the seat support is formed in a single section 25 while in a two-seat sofa, the seat support is formed in two similar endwise adjacent sections and in a three-seat sofa as shown in FIGS. 1 and 5, the seat supports are formed in three similar endwise adjacent sections. A removal upholstered back support is provided to extend between the third tube and the seat support. In a chair, the back support is formed in one section 26 while in a two-seat sofa the back support is formed in two similar sections and, in a three-seat sofa, in three similar sections as best shown in FIG. 5.

Figure 2:
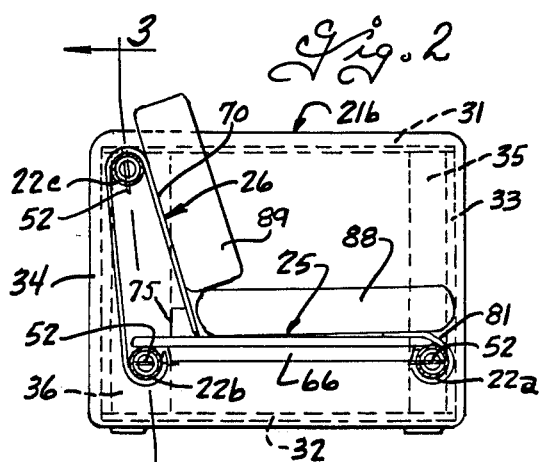
FIG. 2 is a transverse sectional view through the sofa taken on the plane 2—2 of FIG. 1.
Figure 3:
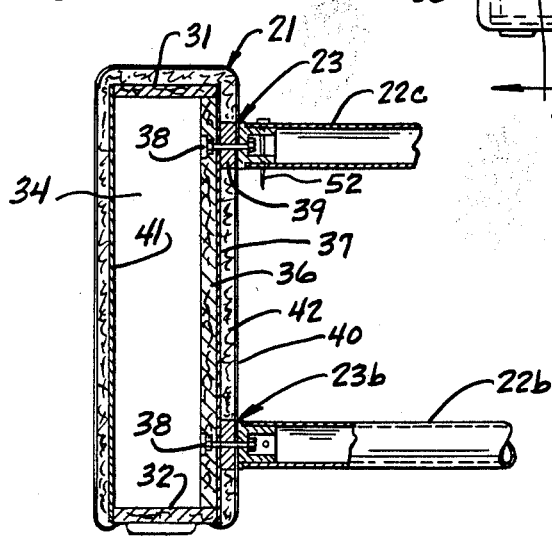
FIG. 3 is a fragmentary sectional view taken on the plane 3—3 of FIG. 2.

The end frames 21a and 21b are of like construction and like numerals are used to designate corresponding parts. In the embodiment of FIGS. 1-10, the end frames are upholstered and include top and bottom frame members 31 and 32 and front and rear frame members 33 and 34 that are rigidly connected to the top and bottom frame members to form a rigid open frame. The frame members 31–34 are conveniently formed of wood and intermediate frame members 35 and 36 are secured to the frame. In the embodiment shown in FIGS. 1–10, frame members extend alongside the front and rear frame members 33 and 34 and between the top and bottom members 31 and 32. As best shown in FIG. 3, a panel 37, conveniently of thin fiberboard or pressed wood, is attached to the inner side face of each of the end frames to provide a backing for the upholstery padding. In order to mount the tube and connector members on the end frames, the intermediate frame members 35 and 36 are provided with openings at each of the desired locations for the connector members and a fastener such as a T-nut 38 is mounted in each of the openings as best shown in FIGS. 3 and 4. A block 39 is attached to the outer face of the panel 37 around each of the openings, and the block is selected to have a thickness corresponding to the desired padding thickness and has an opening therethrough aligned with the T-nut. A second panel 41, also conveniently of thin fiberboard or pressed wood, is attached to the outer side of each of the end frames to provide a backing for the upholstery. Upholstery padding 42 is thereafter applied around the top and opposite sides and front and rear of the end frame, with openings being cut out in the padding around each of the blocks 39. Thereafter, upholstery fabric 40 is applied over the end frames. The upholstery fabric is preferably presewn to form an open-ended pocket which can be pulled over each end frame and across the outer faces of the blocks 39 and attached as by staples or tacks to the underside of the end frame.

The tube end connector members are preferably formed of a strong synthetic resin material, for example glass reinforced nylon and, as best shown in FIG. 4, each include an end wall 45 and an annular wall 46 having an outer diameter to be received in the end of a tube, and an annular shoulder 47 extending outwardly from the annular wall to engage the end of the tube. The end wall 45 has an opening 45a therethrough to receive a bolt 48 that extends through the opening in the block 39 and into the T-nut 38 to firmly clamp the connector member to the end frame. The tubes 22 are each formed with diametrically opposed openings 49 spaced a preselected distance from the ends, and the annular wall portion 46 of the end connector member is formed with diametrically opposed openings 51 which are spaced from the shoulder 47 a distance corresponding to but preferably slightly less, for example about 0.005 inches less, than the preselected spacing of the holes 49 from the end of the tube. With this arrangement, the openings 49 and 51 in the tube and end connector member can be arranged in substantial registry when the end of the tube is initially positioned against the shoulder 47 on the connector member. A pin 52 having a head 52a at one end and a tapered end 52b at its other end is provided and is arranged to be driven into the openings 49 and 51 to cam the end of the tube firmly against the shoulder 47 and to lock the tube against axial withdrawal from the tube connector member.

The tubes 22a–22c are formed of metal such as thin wall welded steel tubing preferably having a diameter of about two inches to provide adequate strength to support the seating loads imposed on the furniture. The seat supports 25 can be a rigid panel of plywood, pressed wood or the like but are preferably formed as best shown in FIG. 10 with a rigid frame having front and rear members 61 and 62 interconnected by side members 63, with a spring deck 64 disposed inside the frame. A flexible sheet of cover material such as cloth 65 is attached to the frame and overlies the top of the seat support frame. The seat supports 25 are preferably dimensioned to overlie the tops of the tubes 22a and 22b and extend therebetween as shown in FIG. 2, and a reinforcing and locating member 66 is attached to the sides 63 of the frame to extend downwardly between the tubes 22a and 22b and locate the seat support member thereon. As previously described, one seat support section 25 is provided for a chair while two are provided for a two-seat sofa and three are provided for a three-seat sofa. With this arrangement, the seat supports 25 for a two or three-seat sofa can be stacked one upon the other for compact packaging.

The back support 26 is arranged to provide a back support between the third tube and the seat support, and to also cover the back side of the furniture. In the embodiment of FIGS. 1–10, the back support is in the form of an upholstered back wrap 70 which is arranged to overlie the third tube 22c and to extend downwardly at the rear side of the third tube to the lower rear tube 22b, and to also extend downwardly at the front side of the rear tube to the seat support 25. As best shown in FIG. 9, the upholstered back wrap includes a cover sheet 73 of upholstery fabric, a layer of padding 74 underlying the cover sheet and reinforced panels designated 71a–71c in FIG. 5 which are formed of thin pressed wood or the like. The panels 71a and 71b are spaced apart as shown in FIGS. 5 and 9 to allow the wrap to curve over the top of the third tube 22c and the panels 71b and 71c are spaced apart to allow the wrap to curve around the bottom of the lower rear tube 22b. Apertured attaching straps 72 are secured as by screws or rivets to the back support member at the panel 71c and are located to receive the projecting ends of tube attaching pins on the lower rear tube. In a single seat chair, the tabs are spaced to receive the projecting ends of the pins 52 that connect the ends of the tube 22b to the end connector members 23b. In two and three-seat sofas, the tubes are provided with additional openings 49a intermediate their ends (see FIG. 5) to receive pins similar to the pins 52. A rail 75 is secured to the upper side of each of the seat support sections 25 to extend parallel to the tube 22b adjacent the rear side of the seat support. A means such as snaps or releasable connectors 77 which can be made from "Velcro" TM, designated 77a and 77b, are provided on one end of the back wrap 70 and on the rail 75, to releasably secure the lower end of the front portion of the back wrap to the rail. The reinforcing panel 71a is dimensioned to extend between the upper rear tube 22c and the rail 75 to reinforce and support the front side of the back wrap and the panel 71b is dimensioned to extend between the third tube 22c and the second tube 22b, to reinforce the back side of the back wrap. In chairs, only a single back wrap is provided while two similar back wraps are provided for two-seat sofas and three similar back wraps are provided for three-seat sofas and arranged in end-to-end relation. With this arrangement, the back wraps can be compactly packaged.

An upholstered front wrap 81 is provided for covering the front tube 22a and the forward end of the seat support 25. As best shown in FIG. 8, the front wrap is formed of a sheet of upholstery fabric 80 over a layer of padding 82, and reinforcing panels 83a and 83b formed of thin pressed wood or the like. Apertured attaching straps 84 are secured to the front wrap 81 as by rivets that extend through the reinforcing panel 83b, and the straps are located at spaced locations to receive the projecting end of pins 52 on the tube 22a. The reinforcing panels 83a and 83b are spaced apart to allow the wrap to be curved around the forward side of the tube 22a and detachable fasteners 85a and 85b similar to those previously described at 77a, 77b, are provided on the front wrap and on the top of the seat support panel, to detachably secure the front wrap to the seat support panel. For two and three-seat sofas, the front wrap is preferably formed in separate sections, with one for each seat. Thus, for a three-seat sofa as shown in FIG. 1, the front wrap is formed in three sections arranged end-to-end when attached to the furniture structure.

The upholstered furniture construction shown in FIGS. 1-10 is of the loose cushion type and includes a loose seat cushion 88 and a back cushion 89. For multiple seat furniture such as a three-seat sofa, three seat cushions and three back cushions are provided.

The upholstered furniture structure shown in FIG. 11 is similar to that previously described in connection with FIGS. 1-10, and like numerals are used to designate the same part, and with like numerals followed by the postscript ' used to designate modified parts. In this embodiment, the end frames 21' are exposed wood frames and include top and bottom frame members 31' and 32' and front and rear frame members 33' and 34'. A generally horizontal intermediate frame member 35' extends between the front and rear frame members at the inner side thereof and an upright intermediate frame member 36' extends upwardly from the frame member 35 at the inner side of the end frame. The tube attaching members 22a and 22b are attached to the inner side of the intermediate frame member 35' as by the bolt and T-nuts previously described before the intermediate frame member is secured to the frame members 33' and 34'. The tube end connecting member 23c is attached to the upper end of the intermediate frame member 36' as by a bolt and T-nut, before the intermediate frame member 36' is attached to the rear frame member 34'. With this arrangement, the T-nuts will be concealed by the front and rear frame members 33' and 34' and the frame members 35' and 36' are dimensioned and shaped so as to cover and conceal the ends of the seat supports and back supports.

Another embodiment of the knockdown upholstery chair construction is illustrated in FIG. 12 and like numerals followed by the postscript " are used to designate the parts corresponding those described in connection with FIGS. 1-10. As in the preceding embodiment, the end frames 21" have three tube end connector members 23a, 23b and 23c attached to their adjacent side faces. A seat support 25" is removably mounted on the tubes 22a and 22b and extends therebetween. A locating member 66" is provided at the underside of the seat support members to extend between the tubes 22a and 22b and locate the seat support thereon. The seat support 25" can be a solid panel but is preferably in the form of a frame having a spring deck extending across the frame to provide a resilient seat support as previously described in connection with FIG. 10. In this embodiment, the seat cushion is permanently attached to the seat support 25". For this purpose, the seat support 25" is provided with a depending face strip 91 that extends downwardly along the front side of the tube 22a, and the seat cushion designated 88" includes cushion padding that overlies the seat support 25" and covered by upholstery fabric that is attached as by tacks or staples to the seat support.

In this embodiment, the back support 26" is arranged so that it can project above the upper tube 22c, to provide a higher back or a contoured back for the chair or sofa when that is desired. As best shown in FIG. 12, the back support includes a front panel 71a" and a rear panel 71b" that are formed of a pressed wood or the like and rigidly interconnected at a level above the upper tube 22c by blocks 92 and a top frame member 90. The rear back rest is arranged to be slipped downwardly over the upper tube 22c to the position shown in FIG. 12 with the panel 71a disposed at the front side of the tube 22c and projecting thereabove and the panel 71b disposed at the rear side of the upper tube 22c and extending downwardly to a level adjacent the lower rear tube 22b, when the blocks 92 rest on the upper tube. A support rail 75" is attached to the seat support 25" at a location to engage the lower edge of the panel 71a", and reinforcing strips 93 and 94 are attached to the lower ends of the panels 71a" and 71b" respectively. In this embodiment, the rear cushion is attached directly to the back support and includes cushion padding 89' overlying the panel 71a" with a covering sheet of upholstery fabric extending from below the lower edge of panel 71a" over the cushion padding 89" and over the top frame member 90 and then down along the rear side of the panel 71b" to its lower edge. Any suitable means may be provided for detachably securing the removable back support in position. In the embodiment shown, bolts 95 are attached to the reinforcing strip 93 and extend downwardly through openings in the seat support 25". A nut can then be threaded on the bolt 95 to clamp the back support to the seat support. A means such as a C-shaped clamp 97 can also be secured to the seat support by the bolt 95 and arranged to engage the lower rear tube 22b to clamp the back support and seat support to the rear tube.

From the foregoing it is thought that the construction and the manner of assembly of the knockdown upholstered furniture construction will be readily understood. The end frames are preassembled with the tube end connector members 23a, 23b and 23c on the adjacent side faces. In order to assemble the furniture, it is only necessary to position the ends of the tubes 22a-22c onto the respective end connector members and drive the pin 52 through the openings in the end of the tube and in the connector members. This forms a rigid frame structure on which the seat supports and back supports are removably attached.

In the embodiments of FIGS. 1-10 and 11, the straps 72 on the back wrap 70 are attached to the projecting ends of the pins 52 on the lower tube 22b, and the straps 84 on the front wrap are attached to the projecting ends of the pins 52 on the front tube 22a, as shown in FIG. 6. The seat support 25 is then dropped into position on the front and rear tubes 22a and 22b as shown in FIG. 6. The front wrap 81 is thereafter wrapped around the front tube 22a and attached by connectors 85a to the connectors 85b on the seat support as shown in FIG. 7. The rear wrap 70 is drawn over the rear side of the upper rear tube 22c and then down at the front side of the rear tube and attached by connectors 77a to the connectors 77b on the rail 75 on the seat support as shown in FIG. 7. The seat cushions 88 and back cushions 89 are thereafter positioned on the seat and back supports respectively.

In a chair, only a single seat support and back support as well as single seat cushion and back cushion are utilized. In two and three-seat sofas, two and three-seat support sections and back support sections are respectively provided with a corresponding number of seat and back cushions. Conveniently, the same size seat supports, back supports and seat cushions are used for the chairs and the two and three-seat sofas, to minimize the number of different size pieces that have to be manufactured and stocked. The length of the tubes used for two and three-seat sofas are respectively two times and three times the length of the tubes used for a chair. The tubes for a chair and for sofas have openings 49 adjacent each end for receiving the pins 52 that attach the tubes to the end frames. In two and three-seat sofas, the longer tubes are provided with additional diametrically extending openings designated 49a in FIG. 5 intermediate their ends at locations to receive pins for engagement with the apertured straps 84 and 72 on the front wraps and back wraps respectively.

In the embodiment of FIG. 12, the seat and back cushions are permanently attached to the seat supports 25″ and back supports 26″. This reduces the number of pieces that must be formed and shipped. In addition, this construction enables the back support to project above the upper rear tube 22c to provide a higher back support. Further, this construction allows the upper portion of the back support to be longitudinally contoured, if desired.

Although the tubes 22a-22c for a sofa must be about six feet long to correspond to the length of a conventional three-seat sofa, the tubes can still be compactly packaged in close adjacency so that they can be shipped under the 108 inch maximum combined length and girth lmiitations for some carriers. The seat supports and back supports for a multiple seat sofa are formed in sections so that they can also be compactly packaged within the above-mentioned maximum package size limitations. The other parts such as the end frames and the cushions and wraps are small enough to come within the maximum package size limitations, even when multiple parts are packaged in the same carton. This ability to package the various parts of even long sofas in cartons that come under the maximum package size limitations for some shippers, markedly reduces the overall cost of shipping.

The embodiments of the invention in which an exclusive property or privilege is claimed are defined as follows:

1. A knockdown upholstered furniture construction comprising, first and second end frames each having an inner and an outer side face and a top, bottom, front and rear, the end frames being adapted to be positioned with their inner side faces laterally spaced apart and facing each other, first, second and third individual metal tubes, first, second and third tube end connector members rigidly mounted on the inner side faces of each of the first and second end frames, the first tube end connector members being mounted at a location spaced above the bottom and adjacent the front of the respective first and second end frames, the second tube end connector members being mounted at a location spaced above the bottom and spaced rearwardly of the first end connector member on the respective end frame, the third tube end connector members being mounted at a location spaced above the second tube end connector member and adjacent the rear of the respective end frame, each tube end connector member having a tube engaging portion extending laterally from the inner side face of the respective end frame and dimensioned to be received inside one end of a respective one of the tubes, said tube end connector members each having an annular shoulder extending outwardly from its tube engaging portion and engageable with the end of a respective one of the tubes when the tube engaging portion is disposed inside the end of the tube, each of the tubes having a transverse pin receiving opening at each end spaced a preselected distance from the end, said tube engaging portions having a transverse pin receiving opening spaced from the shoulder a distance slightly less than said preselected distance and such that it substantially registers with said pin receiving opening in tube when the tube is initially telescoped onto the tube engaging portion and against the shoulder, pin means for detachably securing the ends of the first, second and third tubes to the respective first, second and third tube end connector members on the first and second end frames, the pin means including a pin individual to each end of each tube and having a tapered end to cam the tube end firmly against the shoulder on the associated tube end connector member when the pin is driven through the transverse opening in the tube and into the transverse opening in the tube engaging portion, generally horizontal seat support means removably supported on said first and second tubes and extending therebetween, said seat support means including at least one rigid seat support frame having front, rear and side edges, the seat support frame having means engageable with the first and second tubes for removably supporting and locating the seat support frame on the first and second tubes, said seat support means including an upholstered cover means for covering the front of the first tube and the first tube end connector members, and a removable upholstered back support means extending between the third tube and the seat support means.

2. A knockdown upholstered furniture construction according to claim 1 wherein the back support means includes a rigid front panel extending downwardly at the front side of the third tube to the seat support frame and a rear panel extending downwardly at the rear side of the third tube to the second tube.

3. A knockdown upholstered furniture construction according to claim 1 wherein the back support means includes at lest one back support section having a top, bottom, and spaced sides; the back support section including a rigid front panel adapted to extend upwardly from the seat support means in front of the third tube to a level above the third tube and a rigid rear panel extending upwardly from the second tube to a level above the third tube and means rigidly interconnecting the front and rear panels at a location above the third tube, the back support section being open betweeen the front and rear panels at the bottom and along that portion of each side that is below the third tube so that the back support section can be installed by lowering the back support section on the third tube with the front and rear panels straddling the third tube, means for attaching the lower edge of the front panel to the seat support frame, and means for attaching the lower end of the rear panel to a second tube.

4. A knockdown upholstered furniture construction according to claim 1 wherein the tubes have a length to space the end frames apart a distance sufficient to accommodate at least two people, the seat support means including at least two separate seat support sections, each seat support section including one of said rigid seat support frames, said seat support sections extending between said first and second tubes at different locations therealong, said removable back support means including at least two separate back support sections at different locations along the third tube and each extending between the third tube and a respective one of the seat support frames.

5. A knockdown upholstered furniture construction according to claim 1 wherein said end frames are formed of wood and have a layer of padding and a cover sheet of upholstery material at least on the inner side faces, and a block of rigid material is interposed between the cover sheet and the wood frame through an opening in the padding in each location where a tube end connector member is mounted to provide a firm support for the tube end connector members.

6. A knockdown upholstered furniture construction according to claim 1 wherein said tube engaging portion of each tube end connector member comprises an annular wall having an end wall at one end, and fastener means extending through the end wall internally of the annular wall of each tube end connector member for rigidly mounting the tube end connector member to the respective end frame.

7. A knockdown upholstered furniture construction according to claim 1 wherein each tube has two transverse pin receiving openings in each end at relatively opposite sides, the pin receiving opening in each tube engaging portion extending through the tube engaging portion, and each pin having a length to extend through the pin receiving opening at one side of the tube and through the pin receiving opening in the tube engaging portion of the associated tube engaging member and out through the pin receiving opening at the side of the tube opposite said one side to a position in which the tapered end of the pin is external of a tube.

8. A knockdown upholstered furniture construction comprising, first and second end frames each having an inner and an outer side face and a top, bottom, front and rear, the end frames being adapted to be positioned with their inner side faces laterally spaced apart and facing each other, first, second and third individual metal tubes, first, second and third tube end connector members rigidly mounted on the inner side faces of each of the first and second end frames, the first tube end connector members being mounted at a location spaced above the bottom and adjacent the front of the respective first and second end frames, the second tube end connector members being mounted at a location spaced above the bottom and spaced rearwardly of the first end connector member on the respective end frame, the third tube end connector members being mounted at a location spaced above the second tube end connector member and adjacent the rear of the respective end frame, each tube end connector member having a tube engaging portion extending laterally from the inner side face of the respective end frame and telescopically engageable with one end of a respective one of the tubes, pin means extending transversely of the tubes and into the tube engaging portion of the associated tube engaging member for detachably securing the ends of the first, second and third tubes to the respective first, second and third tube end connector members, the tubes having a length to space the end frames apart a distance sufficient to accommodate at least two people, seat support means including at least two separate seat support sections, each seat support section including a rigid seat support frame having front, rear and side edges, each seat support frame having means engageable with the first and second tubes for removably supporting and locating the seat support frame on the first and second tubes, said seat support frames extending between said first and second tubes at different locations therealong, said seat support means including cover means for covering the first tue and the first tube end connector members, removable back support means including at least two separate back support sections at different locations along the third tube and each extending between the third tube and the respective one of the seat support frames.

9. A knockdown upholstered furniture construction according to claim 8 wherein each back support section includes a rigid front panel extending upwardly from the seat support in front of the third tube to a level above the third tube and a rigid rear panel extending upwardly from the second tube and along the rear side of the third tube to a level above the third tube, and means rigidly interconnecting the front and rear panels at a location above the third tube.

10. A knockdown upholstered furniture construction according to claim 8 wherein each back support section has a top, bottom, and spaced sides; the back support sections each including a rigid front panel adapted to extend upwardly from the seat support means in front of the third tube to a level above the third tube and a rigid rear panel extending upwardly from the second tube to a level above the third tube and means rigidly interconnecting the front and rear panels at location above the third tube, each back support section being open between the front and rear panels at the bottom and at that portion of the side that are below the third tube so that each back support section can be installed by moving the back support section downwardly over the third tube with the front and rear panels straddling the third tube, means for attaching the lower edge of the front panel to the seat support frame, and means for attaching the lower end of the rear panel to the second tube.

11. A knockdown upholstered furniture construction according to claim 10 including a seat cushion individual to each seat support section and removably mounted thereon and a back cushion individual to each back support section and removably mounted thereon.

12. A knockdown upholstered furniture construction according to claim 8 wherein the tube engaging portions of each tube end connector member is dimensioned to be received inside one end of a respective one of the tubes, said tube end connector members each having an annular shoulder extending outwardly from its tube engaging portion and engageable with the end of a respective one of the tubes when the tube engaging portion is disposed inside the end of the tube, each of the tubes having a transverse pin receiving opening at each end spaced a preselected distance from the end, said tube engaging portions having a transverse pin receiving opening spaced from the shoulder a distance slightly less than said preselected distance and such that it substantially registers with said pin receiving opening in tube when the tube is initially telescoped onto the tube engaging portion and against the shoulder, pin means for detachably securing the ends of the first, second and third tubes to the respective first, second and third tube end connector members on the first and second end frame, the pin means including a pin individual to each end of each tube and having a tapered end to cam the tube end firmly against the shoulder on the associated tube end connector member when the pin is driven through the transverse opening in the tube and into the transverse opening in the tube engaging portion.

13. A knockdown upholstered furniture construction according to claim 8 including a seat cushion individual to each seat support section and removably mounted thereon.

14. A knockdown upholstered furniture construction according to claim 13 including a back cushion individual to each back support section and removably mounted thereon.

15. A knockdown upholstered furniture construction comprising, first and second end frames each having an inner and an outer side face and a top, bottom, front and rear, the end frames being adapted to be positioned with their inner side faces laterally spaced apart and facing each other, first, second and third individual metal tubes, first, second and third tube end connector members rigidly mounted on the inner side faces of each of the first and second end frames, the first tube end connector members being mounted at a location spaced above the bottom end adjacent the front of the respective first and second end frames, the second tube end connector members being mounted at a location spaced above the bottom and spaced rearwardly from the first end connector member on the respective end frame, the third tube end connector members being mounted at a location spaced above the second tube end connector member and adjacent the rear of the respective end frame, each tube end connector member having a tube engaging portion extending laterally from the inner side face of the respective end frame and telescopically engageable with one end of a respective one of the tubes, pin means extending transversely of the tubes and into the tube engaging portions for detachably securing the ends of the first, second and third tubes to the respective first, second and third tube end connector members on the first and second end frames, generally horizontal seat support means removably supported on first and second tubes and extending therebetween, said seat support means including at least one rigid seat support frame having front, rear and side edges, the seat support frame having means engageable with the tubes for removably supporting and locating the seat support frame on the first and second tubes, the seat support means including an upholstered cover means for covering the front of the first tube and the first tube end connector members, a removable upholstered back support means extending between the third tube and the seat support means, the back support means including at least one back support section having a top, bottom, and spaced sides; the back support section including a rigid front panel adapted to extend upwardly from the seat support means in front of the third tube to a level above the third tube and a rigid rear panel extending upwardly from the second tube to a level above the third tube and means rigidly interconnecting the front and rear panels at location above the third tube, the back support section being open between the front and rear panels at the bottom and at that portion of the sides that are below the third tube so that the back support section can be installed by moving the back support section downwardly over the third tube with the front and rear panels straddling the third tube, means for attaching the lower edge of the front panel to the seat support frame, and means for attaching the lower end of the rear panel to the second tube.

16. A knockdown upholstered furniture construction according to claim 15 wherein said means for attaching the lower edge of the front panel to the seat support frame includes a panel stop projecting upwardly from adjacent the rear of the seat support frame and engageable with the rear side of the front panel adjacent its lower edge.

17. A knockdown upholstered furniture construction according to claim 15 including a seat cushion removably mounted on the seat support frame and a back cushion removably mounted on the back support means.

* * * * *